(12) United States Patent
Fink et al.

(10) Patent No.: US 12,067,683 B2
(45) Date of Patent: Aug. 20, 2024

(54) LOCATION PERSISTENT AUGMENTED REALITY OBJECT AND ANNOTATION PLACEMENT

(71) Applicant: STREEM, INC., Portland, OR (US)

(72) Inventors: Ryan R. Fink, Vancouver, WA (US); Sean M. Adkinson, North Plains, OR (US)

(73) Assignee: STREEM, LLC, Portland, OR (US)

( * ) Notice: Subject to any disclaimer, the term of this patent is extended or adjusted under 35 U.S.C. 154(b) by 0 days.

(21) Appl. No.: 16/570,674

(22) Filed: Sep. 13, 2019

(65) Prior Publication Data

US 2020/0090409 A1  Mar. 19, 2020

Related U.S. Application Data

(60) Provisional application No. 62/731,664, filed on Sep. 14, 2018.

(51) Int. Cl.
*G06T 19/00* (2011.01)
*G06T 7/50* (2017.01)

(52) U.S. Cl.
CPC .............. *G06T 19/006* (2013.01); *G06T 7/50* (2017.01); *G06T 2200/24* (2013.01); *G06T 2207/10028* (2013.01)

(58) Field of Classification Search
None
See application file for complete search history.

(56) References Cited

U.S. PATENT DOCUMENTS

| | | | |
|---|---|---|---|
| 9,471,834 B1* | 10/2016 | Filip | G06F 16/29 |
| 2010/0194782 A1* | 8/2010 | Gyorfi | H04W 4/022 |
| | | | 345/633 |
| 2010/0214111 A1* | 8/2010 | Schuler | H04W 4/021 |
| | | | 340/686.1 |
| 2012/0218263 A1* | 8/2012 | Meier | G06T 19/006 |
| | | | 345/419 |
| 2015/0141057 A1* | 5/2015 | Papillon | H04W 4/023 |
| | | | 455/456.3 |
| 2018/0018502 A1* | 1/2018 | Rao | G06V 10/17 |
| 2018/0314698 A1* | 11/2018 | Babushkin | G06F 16/951 |
| 2018/0356883 A1* | 12/2018 | Valentin | G06K 9/00228 |
| 2019/0026948 A1* | 1/2019 | Kellogg | G06T 7/246 |
| 2019/0122375 A1* | 4/2019 | Wang | G06T 19/00 |
| 2019/0297461 A1* | 9/2019 | Charlton | G06K 9/00691 |
| 2020/0050259 A1* | 2/2020 | Lam | G06F 3/04845 |
| 2020/0125830 A1* | 4/2020 | Lei | G06V 10/462 |
| 2020/0250403 A1* | 8/2020 | Xiao | G06T 7/50 |
| 2021/0049799 A1* | 2/2021 | Tagra | G06T 7/60 |

* cited by examiner

*Primary Examiner* — Jeffrey J Chow
(74) *Attorney, Agent, or Firm* — Schwabe Williamson & Wyatt

(57) ABSTRACT

Methods for placement of location-persistent 3D objects or annotations in an augmented reality scene are disclosed. By capturing location data along with device spatial orientation and the placement of 3D objects or annotations, the augmented reality scene can be recreated and manipulated. Placed 3D objects or annotations can reappear in a subsequent capture by the same or a different device when brought back to the location of the initial capture and placement of objects. Still further, the placed 3D objects or annotations may be supplemented with additional objects or annotations, or the placed objects or annotations may be removed or modified.

11 Claims, 5 Drawing Sheets

LOCATION PERSISTENT AUGMENTED REALITY OBJECT AND ANNOTATION PLACEMENT

CROSS-REFERENCE TO RELATED APPLICATIONS

This application claims the benefit of U.S. Provisional Application No. 62/731,664, filed on 14 Sep. 2018, the entire contents of which are hereby incorporated by reference herein.

TECHNICAL FIELD

The present disclosure relates to the field of augmented reality (AR), and specifically to placing AR objects and annotations at geographic locations in a persistent fashion.

BACKGROUND

Devices such as smartphones and tablets are increasingly capable of supporting augmented reality (AR). These devices may capture images and/or video and, depending upon the particulars of a given AR implementation, the captured images or video may be processed using various algorithms to detect features in the video, such as planes, surfaces, faces, and other recognizable shapes. These detected features, combined in some implementations with data from depth sensors or motion information captured from motion sensors such as a MEMS gyroscope and accelerometers, can facilitate AR software in creating a point cloud in a three-dimensional space. This point cloud enables AR-based applications to generate and place virtual objects and annotations within a 3-D space represented by the captured images and/or video.

In addition to capturing a point cloud, such devices are typically location-aware, or otherwise capable of sensing or marking the physical or geographic location where a given image or video is captured.

BRIEF DESCRIPTION OF THE DRAWINGS

Embodiments will be readily understood by the following detailed description in conjunction with the accompanying drawings. Embodiments are illustrated by way of example and not by way of limitation in the figures of the accompanying drawings.

DETAILED DESCRIPTION OF DISCLOSED EMBODIMENTS

Figure 1:
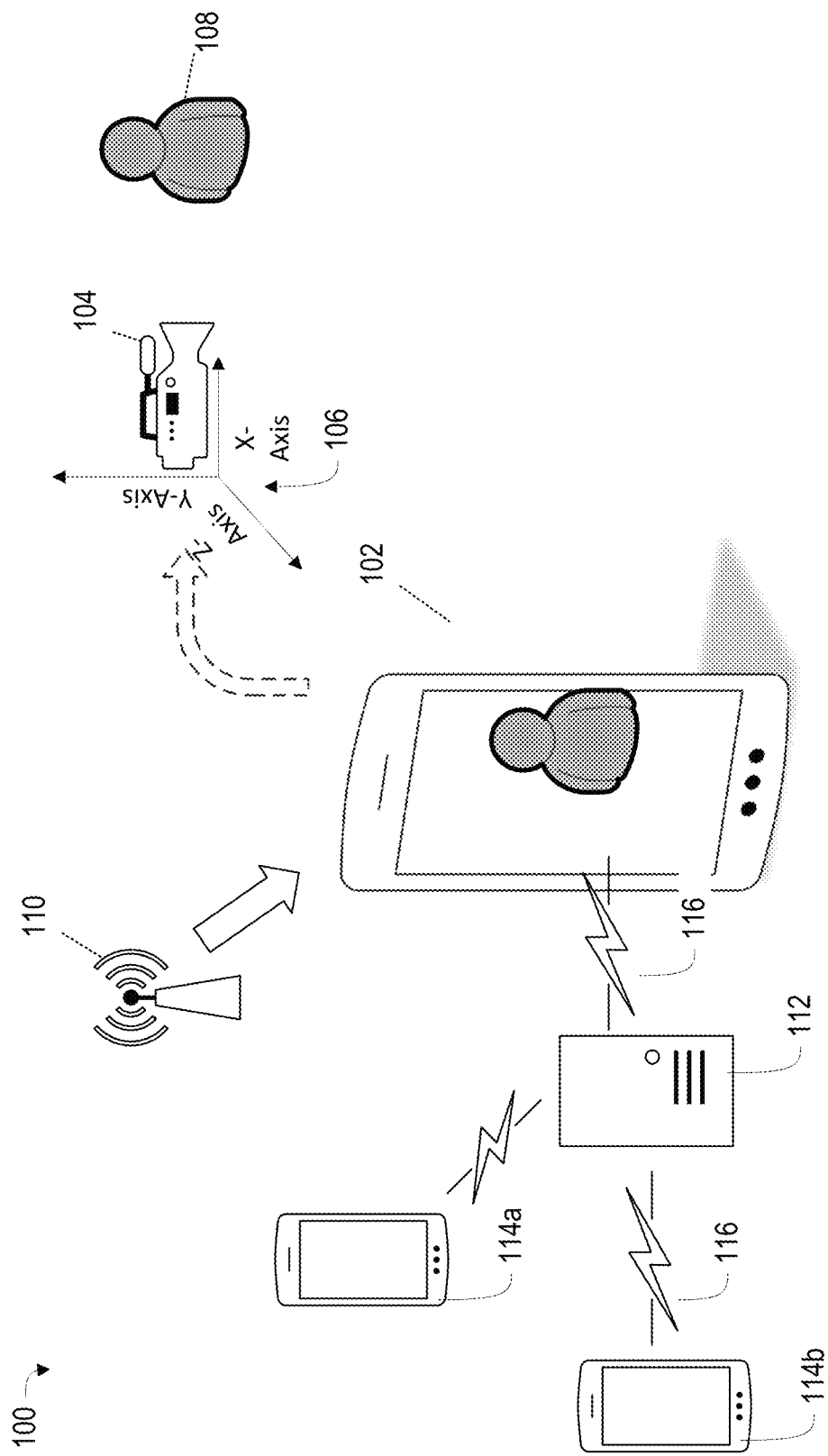
FIG. 1 illustrates a block diagram of the components of a system for capturing an image and corresponding AR data, according to various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

The description may use perspective-based descriptions such as up/down, back/front, and top/bottom. Such descriptions are merely used to facilitate the discussion and are not intended to restrict the application of disclosed embodiments.

The terms "coupled" and "connected," along with their derivatives, may be used. It should be understood that these terms are not intended as synonyms for each other. Rather, in particular embodiments, "connected" may be used to indicate that two or more elements are in direct physical contact with each other. "Coupled" may mean that two or more elements are in direct physical contact. However, "coupled" may also mean that two or more elements are not in direct contact with each other, but yet still cooperate or interact with each other.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous.

Smartphones, tablets, and similar devices are useable to capture images or video, which may then have 3D objects and/or annotations superimposed to create an augmented reality (AR) scene. 3D objects may include any variety of shapes, e.g. basic shapes such as arrows, blocks, spheres; or more complex shapes such as household objects, fixtures, or other generic objects that may be related to the context of a given image or video; any suitable shape that may be inserted into an image or video may be used. The shape may be static or dynamic, with moving portions. Similarly, annotations may be added, such as notes, sounds, other images or video clips, or any other way of conveying information that can be inserted into or superimposed on the image or video.

Many devices capable of capturing video or images and performing AR processing also capture location information, such as GPS coordinates, of where the image or video is captured. By storing location information along with device orientation or positional information, this location information may be associated with the superimposed objects and/or annotations, thereby allowing the superimposed objects and/or annotations to be recreated at a later time when the device (or another device) is capturing images and/or video at the same location, in a similar orientation.

Disclosed embodiments allow for capturing of an AR object placement within a scene that includes physical location data, such as GPS coordinates, as well as associated scene data such as depth points, anchor points, and/or other data points relevant to the AR object's placement within the physical scene. By capturing and storing such data, suitably equipped devices with access to the AR object and associated physical location data can correlate physical location data of a currently viewed or previously captured scene with the stored AR object physical location data. By reference to the AR object's information, e.g. shape, 3D model, etc., the AR object can be recreated and/or manipulated in the device, even after substantial time differences, as if the AR object were physically present in the scene.

FIG. 1 illustrates an example system 100 that may enable capture of an image or video that includes AR data. System 100 may include a consumer device 102. In the depicted embodiment of FIG. 1, consumer device 102 is a smartphone, which may be implemented as a computer device 500, to be discussed in greater detail below. Other embodiments may implement device 102 as a variety of different possible devices, such as a computer (desktop or laptop), tablet, two-in-one, hybrid, smart glasses, or any other computing device that can accept a camera and provide necessary positional information, as will be discussed in greater detail herein.

Consumer device 102 further includes a camera 104, which may be integrated into consumer device 102 or otherwise attached or in data communication with consumer device 102, and a spatial position sensor 106 (depicted by a series of axes), which provides information about the spatial position of camera 104. Consumer device 102 may further include a location sensor 110, such as a satellite navigation receiver that works with systems such as GPS, Galileo, GLONASS, and others, and allows the geographic location of camera 104 and/or consumer device 102 to be determined. It will be understood that both camera 104, spatial position sensor 106, and/or location sensor 110 may be contained within the body of device 102. In other embodiments, spatial position sensor 106 may be integrated with camera 104, which is separate from device 102. Camera 104 is used to capture the surrounding environment of device 102, and by extension, the user. The environment may include three-dimensional objects 108.

Camera 104 may be any camera that can provide a suitable video stream for the intended purpose of consumer device 102. Where consumer device 102 is implemented as a smartphone or tablet, camera 104 may be a built-in camera. In other embodiments, such as where consumer device is a laptop, camera 104 may be built in or a separate, external unit. A suitable video stream may be a digital video stream, and may be compressed in embodiments with some form of video compression, such as AVC-HD, H.264, MPEG-4, or another suitable compression scheme. Camera 104 may be configured to output standard or high-definition video, 4K video, or another resolution of video suitable for the intended purpose of camera 104 and consumer device 102.

Spatial position sensor 106 may be configured to provide positional information about camera 104, such as camera 104's pan and tilt. Other measured positional vectors may include camera movements, such as the camera rising or falling, or moving laterally. Spatial position sensor 106 may be implemented with micro or MEMS sensors, such as gyroscopes to measure angular movements and accelerometers to measure linear movements such as rises, falls, and lateral movements. In other embodiments, spatial position sensor 106 may be implemented using any suitable technology capable of measuring spatial movements of camera. For example, some spatial movements may be obtained from analysis of successive frames from camera 104, where shifts in identified objects or points of a captured scene across the frame can be correlated to numerical distances of pixels. By knowing the camera's field of view, each pixel can correspond to an angle segment in the frame in x and y terms. Thus, where an object is determined to shift, the number of pixels between the object's previous and current position can be converted to an angular shift of the camera in x and/or y dimensions.

Location sensor 110, as mentioned above, is implemented as a satellite navigation receiver in some embodiments. For example, many smartphones and tablets are equipped with satellite navigation receivers to enable location services for applications such as moving maps, driving instructions, and localized information. Such location information can be used with disclosed embodiments to determine whether consumer device 102 is being used in the same geographic location as a previous time, where 3d objects and/or annotations were previously superimposed. Although location sensor 110 may be implemented using satellite navigation receiver technology, any other type of sensor capable of providing a geographic location fix may be used. Some possible examples include terrestrial navigation systems, such as using proximate radio beacons with known locations e.g. WiFi and/or cellular network locations coupled with triangulation, or any other suitable system or method for locating consumer device 102 and/or camera 104. Location sensor 110 or spatial position sensor 106 may further include heading determination functionality, such as a flux gate or other magnetic sensing compass to calculate the heading of consumer device 102 and/or camera 104 relative to true or magnetic north. Further still, location sensor 110 may, in some embodiments, be integrated with spatial position sensor 106 (such as with a sensor that integrates 9 degrees of freedom). In other embodiments, location sensor 110 may be external to consumer device 102 and/or camera 104, as a discrete board or separate unit, and may communicate with consumer device 102 and/or camera 104 via an interface, such as I2C.

In the embodiment depicted in FIG. 1, device 102 is in communication with a remote server 112, such as via a data communications link 116. Remote server 112 may provide various services to consumer device 102, such as storage of captured images and/or video, storage of various AR or other 3D objects and/or any associated metadata (e.g. location within a frame, geographic location, etc.) Other services may include processing of raw data from the consumer device 102, such as images and/or video from camera 104, information from location sensor 110, information from spatial position sensor 106, and/or information from any other sensor or capture device in consumer device 102. The remote server 112 may process the raw data to determine information described below, such as a point cloud, anchor points, an image fingerprint, and/or other relevant information.

Remote server 112 may be implemented as a single server, as multiple servers, as a cloud service that may be Internet-accessible, as a part of, all or, or multiple data centers, or in any other suitable fashion. Remote server 112 may be implemented using one or more computer devices 500.

Remote server 112 may further be in communication with one or more other devices 114a, 114b, which may be other consumer devices similar to consumer device 102, e.g. smartphones, tables, laptops, computers, etc. It should be understood that devices 114a and 114b are examples; any arbitrary number of devices 114 may be in communication with remote server 112. In some embodiments, remote server 112 may act as a common or network-accessible repository for location persistent AR objects, which may be retrieved by one or more of the other devices 114a and/or 114b. In such embodiments, consumer device 102 and/or one or more devices 114a, 114b may place one or more AR objects into a given scene, such as according to method 200, described below. The placed AR object(s) may then be retrieved or otherwise accessed from the remote server 112 by one or more of the other devices 102, 114, which may be executing method 300, described below.

Each of the other devices 114 may communicate with remote server 112 via a communications link 116. Each communications link 116 may be any suitable link for data communications. Communications link 116 may be wired, wireless, or a combination of both. Examples of suitable communications protocols that may be used with communications link 116 include, e.g., WiFi, Bluetooth, cellular protocols such as HSPDA, UMTS, CDMA, TDMA, GSM, LTE, 5G, or another cellular protocol for carrying data, Ethernet, FDDI, Infiniband, fiber optic, or any other suitable physical, wired, wireless, and/or combination of protocols. Devices may communicate over communications links 116 via data transit protocols such as TCP/IP, ATM, or another suitable technology or combination of technologies. In some embodiments, some or all communications links 116 may be at least partially over the publicly accessible Internet.

Figure 2:
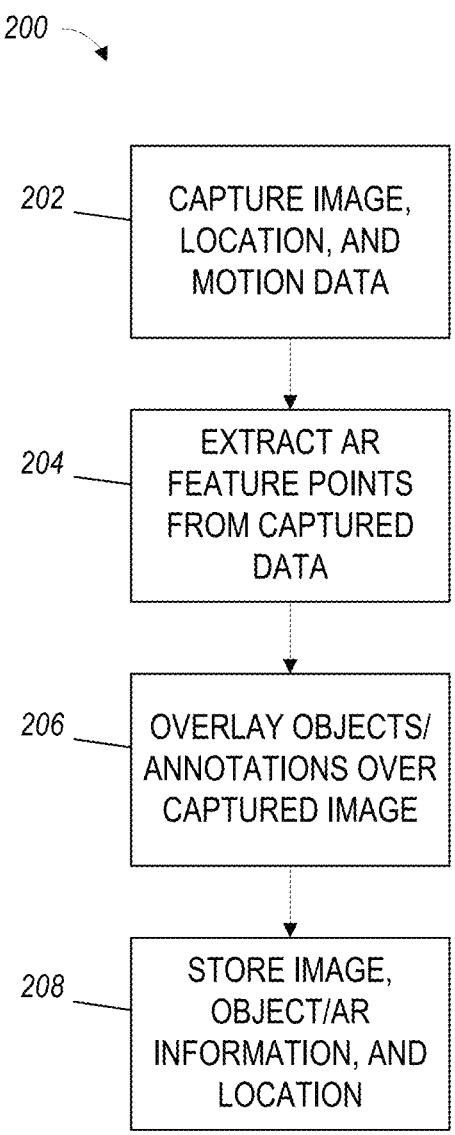
FIG. 2 is a flowchart of a method for capturing an image or video with the addition of AR objects and capture location, and storing at least the AR objects with the particular location, according to various embodiments.

FIG. 2 depicts the operations for a method 200 for capturing both images and/or video along with motion and location data, for placement of persistent 3D objects. Method 200 may be performed in whole or in part by a device such as consumer device 102, and/or may be performed in whole or in part by a remote server or cloud service, such as remote server 112. Further, the various operations may be performed in order or out of order, depending upon the needs of a given implementation.

In operation 202, an image, such as a still frame or a video, may be captured along with associated motion and location data, e.g., from spatial position sensor 106 and location sensor 110 as described above with respect to FIG. 1. The captured image or video may be any suitable file type, e.g. PNG, GIF, JPEG, BMP, TIFF, for images; MOV, MP3, MP4, AVC, for video, to name a few possible file types. The captured image may, depending upon the particulars of a given augmented reality implementation, be used to generate a 3D point cloud, as will be described below.

In operation 204, AR feature points may be extracted from the captured image or video, e.g., as described with respect to FIG. 1. In some embodiments, software and/or hardware may process the capture and perform detection of objects and surfaces to establish anchor points. Techniques and routines for generating feature points may be provided via existing operating system interfaces or libraries, such as ARKit provided by Apple's iOS, ARCore provided by Google's Android, and the cross-platform ARToolKit, to name a few possible examples. This detection may result in a feature point cloud useable for the placement of 3D objects and annotations. Obtaining a point cloud may also be handled by custom routines, or may be handled off-device by a cloud service, where consumer device 102 uploads the image or video as well as motion information to the cloud service for processing and extraction of a point cloud. Still other embodiments may use direct measurement of depth points within the image or video, such as by an infrared or LIDAR scanner to obtain depth points. The point cloud may be expressed in any suitable fashion, such as a list of pixel coordinates coupled with depth data on a per-frame basis. Some embodiments may provide depth data and anchor points within the image using a method or technique different from a point cloud; it should be understood that any way of extrapolating and representing depth data from an image or video may be employed.

In operation 206, objects and/or annotations may be inserted or otherwise overlaid upon the image or video, using depth data from the calculated or measured point cloud (or other expression of depth data) to scale and orient the object. It will be understood by a person skilled in the relevant art that where a video is captured, the point cloud may change over time, such as from frame to frame, as the perspective and position of the camera 104 changes. As the point cloud (and thus associated depth data) changes with each successive frame, inserted objects and/or annotations may be transformed and scaled to maintain an appearance of being placed within the image or video, as though a part of the scene. The use of anchor points ensures that the placed objects are tied to a particular scene, rather than a position within the camera frame. Thus, as will be understood, the inserted objects may move in and out of frame, such as if camera 104 is panned across a scene with an overlaid 3D object.

Finally, in operation 208, the captured image or video, along with motion data, location data, and/or inserted 3D objects or annotations, may be stored. For purposes of the disclosed embodiments, storing the image or video may be unnecessary (although preferable in some embodiments). It may be sufficient to store just the 3D objects or annotations along with the geographic location of capture (and thus where the 3D objects or annotations were superimposed), plus device orientation and any depth and anchor points needed to positively locate and orient the 3D objects or annotations for subsequent capture of video or images. For example, while location data may provide the geographic proximity for overlaid 3D objects or annotations, device orientation data (including heading) may be needed to determine placement of an object or annotation relative to a GPS (or similarly obtained) device location, which does not necessarily indicate which direction the device is facing at a given location.

Further still, depth data, such as is obtainable from a point cloud, may be needed to determine scale and actual in-frame position of a placed 3D object or annotation. These components of location, orientation, heading, and depth data may be stored along with the 3D objects or annotations to allow subsequent recreation of a previously captured AR scene. In some embodiments, image and orientation data may allow additional objects or annotations to be added to previously captured images or videos. Furthermore, the data may be stored locally on a consumer device 102, such as associated with a specific app (where consumer device 102 is a smartphone, tablet, or other device capable of executing an app), may be stored on a remote server such as a cloud storage, e.g. remote server 112, or both.

It should be understood that the various operations of method 200 may be performed at the same time, or at different times, or by a combination of a consumer device 102, device 114, and/or remote server 112. For example, operations 202 and 204 may be performed at a first time, with the captured image, orientation, and location data, along with extrapolated depth data, being stored. Operations 206 and 208 may be performed at a later second time, using the stored image, orientation, location, and depth data being used to place 3D objects or annotations, and store them. Moreover, the stored objects and/or annotations may be stored with the captured image, orientation, location, and depth data, or may be stored separately.

Figure 3:
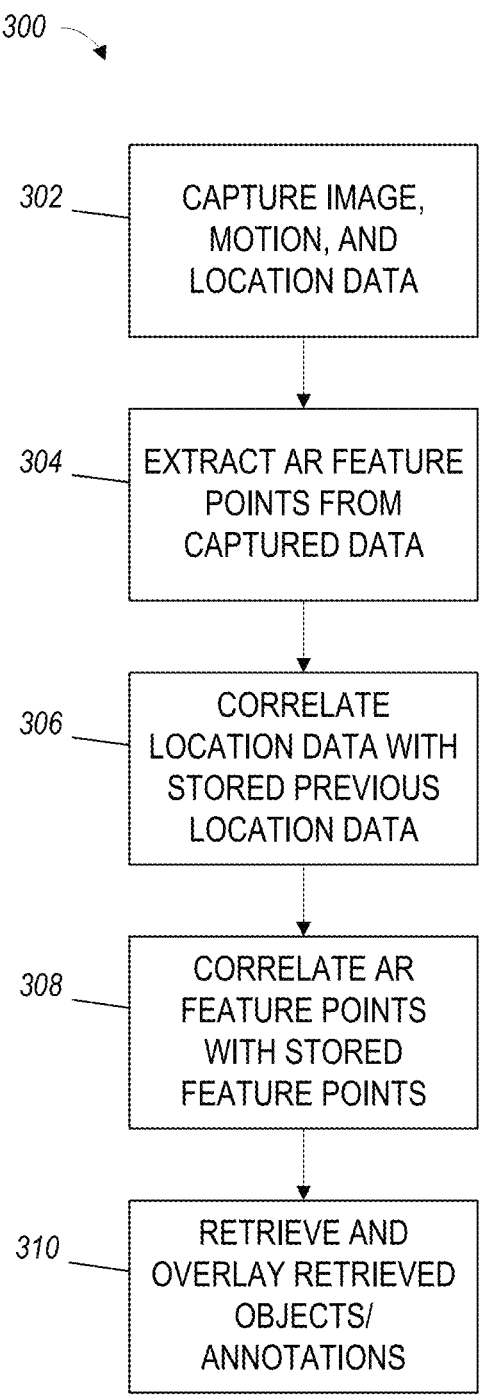
FIG. 3 is a flowchart of a method for recreating an image or video with the previously captured AR objects in the method of FIG. 2, according to various embodiments.

FIG. 3 depicts the operations for a method 300 for capturing both images and/or video along with motion and location data, for placement of persistent 3D objects. Method 300 may be performed in whole or in part by a device such as consumer device 102, and/or may be performed in whole or in part by a remote server or cloud service, such as remote server 112. Further, the various operations may be performed in order or out of order, depending upon the needs of a given implementation.

Operation 302 is substantially identical in operation to operation 202 of method 200, described above with respect to FIG. 2. Likewise, in operation 304, AR feature points may be extracted from the subsequently captured image, as described above with respect to FIGS. 1 and 2. Specifically, the operations of operation 304 are substantially identical to the operations of operation 204 described above.

In operation 306, the location data may be retrieved, either from local stores, e.g. local storage or memory on consumer device 102, or from a remote store, e.g., remote server 112, or both, along with relevant orientation data, as described above with respect to FIGS. 1 and 2. The current location of the device, such as consumer device 102, is determined and correlated with the retrieved location data. If the two locations are sufficiently close, orientation data may be analyzed to determine whether the device is looking or otherwise oriented in approximately the same direction and perspective as the camera or other image capture device (such as a camera 104) used for the initial capture. Whether the locations are sufficiently close may depend upon the specifics of a given implementation of method 300, as well as possible differences between a device (such as consumer device 102) used to perform the initial capture of method 200, and a device used to perform method 300. The devices may be, but need not be, the same.

Depending upon the embodiment, the location of the device may be periodically checked with the location of the source capture. In other embodiments, the location of the device may be checked against the location of the source capture upon demand by a user of the device. In still other embodiments, a geofence may be used to automatically trigger checking with or retrieving the source capture when the device is within a predetermined distance from the location of the source capture. In some embodiments, the source capture may be stored at least partially into, or otherwise indexed by, a database system that allows for a location-based query. A location-based query may return one or more AR objects and associated location data when a location used for the query is within a predetermined distance from the associated location data.

In operation 308, once it is determined that the implementing device is in approximately the same location as the initial capture from method 200 and is further in approximately the same orientation and heading, the subsequent capture and its associated 3D point cloud may be correlated with the source capture and point cloud. Such correlation may involve comparing recognized objects from the scene stored in operation 208 with objects recognized from the scene captured in operation 302, as well as derived anchor points. The point cloud associated with each capture may be expressed via an x-y-z coordinate system that is referenced with respect to the capture. Correlation may allow establishing of a single or common coordinate system between captured images so that their corresponding point clouds may be merged, to facilitate operation 310. Without correlation, the point cloud of the subsequent capture may not properly align in space with the point cloud of the source capture, and superimposition of previously stored 3D objects and/or annotations may not be feasible, or may not be accurate to original placement.

Correlation may be accomplished by a variety of methods, and may be performed in whole or in part by a device, such as consumer device 102, and/or a remote server or cloud service, such as remote server 112. For example, some embodiments may employ object matching between captures. An anchor point or object in the source capture may be determined and/or selected, which is then located within the subsequent capture to tie the images together. Such anchor point may be determined via object recognition, particularly if the source capture includes a particularly unique object or feature that may be readily identified. Identifying an anchor provides a common reference point between the source and subsequent captures from which the respective coordinate systems can be aligned and translated. Other possible embodiments of this nature include a unique visual tag that is part of the frame that is easily recognized by an image recognition algorithm. Such a tag may have predefined physical characteristics, such as shape and dimensions. Distance and orientation to the tag may then be determined by comparing the known characteristics with the captured image.

Other examples may use different techniques for correlation. As an extension of operation 306, in some embodiments geolocation services such as GPS may be used to determine that the subsequent capture is taken in approximately the same location as the source capture. Combined with orientation information such as may be provided by a compass, it can be established that the devices capturing the source and subsequent images, respectively, were in approximately the same location and facing approximately the same direction. By determining such device orientation, it may not be necessary to establish a single unique anchor point, as the location and orientation of each device may provide sufficient common reference information to derive a common coordinate system. Geolocation may also be supplemented or alternatively determined on the basis of known nearby markers, such as radio beacons like WiFi hotspots, NFC/RFID readers, Bluetooth, etc.

Still other embodiments may use a combination of the foregoing, or may allow a user to manually indicate when an initial and subsequent capture are of identical or similar scenes, as well as other characteristics, such as designating a common anchor point.

It will be appreciated by a person skilled in the relevant art that some methods of correlation may be more suitable when aspects of the environment vary between initial and subsequent captures. For example, if furniture and/or decorations are altered somewhat between the time of the source capture and subsequent capture, a correlation method that does not exclusively rely upon an anchor point (which may have been moved or removed between captures) may still allow captures to be correlated.

Other examples may determine multiple possible anchor points, such as creating a "fingerprint" of a scene. A fingerprint may allow for accurate correlation even if one or more anchor points change between the source and subsequent captures. Such a fingerprint may be based at least in part on a pattern of depth points and anchor points, and/or by other possible identifiable landmarks, such as detected objects or shapes. The fingerprint further may be based upon multiple landmarks or points, to accommodate the possibility of an object or objects being moved, removed, or added. Where the fingerprint uses multiple points and/or detected objects, a threshold number of landmarks, points and/or objects that is less than the total number of landmarks, points and/or objects of the fingerprint may be established for determining whether a subsequent capture is correlated with the fingerprinted scene. Thus, if an object is removed, moved, or added to the subsequently captured location, the location nevertheless may be correlated to the fingerprinted scene so long as at least a number of landmarks, points, and/or detected objects in the subsequent capture matches to corresponding landmarks, points, and/or detected objects in the fingerprint that at least meets the threshold number.

Where the scene has changed, in some embodiments, the device executing method 300 may update the location data, e.g. 3D capture and point cloud data, plus any other captured location data, to reflect the changes to the scene. This data may be sent back to a remote service, such as remote server 112, where information about the AR objects and associated location data may be stored.

In operation 310, once the initial and subsequent captures are correlated, the previously placed 3D objects and/or annotations may be retrieved, either from a local store, such as an app, or from a remote source. The positions, scale, and orientations of each object or annotation can be retrieved and aligned with the orientation and point cloud of the image or video captured in operation 302. Once aligned with the orientation and point cloud of the current capture, the objects and/or annotations may be recreated and superimposed on the current capture, thus making the superimposed objects or annotations appear to be fixed within the frame across captures at different times.

It should be appreciated that such captures and object placement may happen contemporaneously. For example, a user of a device such as consumer device 102 may stream a live video from a camera 104, along with orientation and location information, to a remote device or terminal, where a remote user may superimpose and/or manipulate 3D objects upon the video stream, viewable to the user. The superimposed and/or manipulated 3D objects may be saved, and later recreated using the methods 200 and 300 described above.

Still further, in addition to 3D objects, other objects, data, or files can be tagged to physical locations, and appear in the image or video. Other objects, data or files may include text, documents, manuals, PDFs, other embedded images or videos, 2D shapes and pictures, or any other suitable data that can be tagged to a location in an image or video, with the image or video used for subsequent retrieval. Where the other objects, data or files comprise documents or images (such as a PDF or video), a user may be able to open and interact with the tagged object, such as by tapping or clicking on the object where it appears in the image or video.

Still further, the 3D or AR objects placed within a scene may be manipulated, moved, modified, removed, or additional AR objects added, by a subsequent viewing device. Where the AR object information is stored on a remote system such as remote server 112, the changes to the AR object (including any revised or new point cloud or other location data) may likewise be stored back to the remote system.

Figure 4:
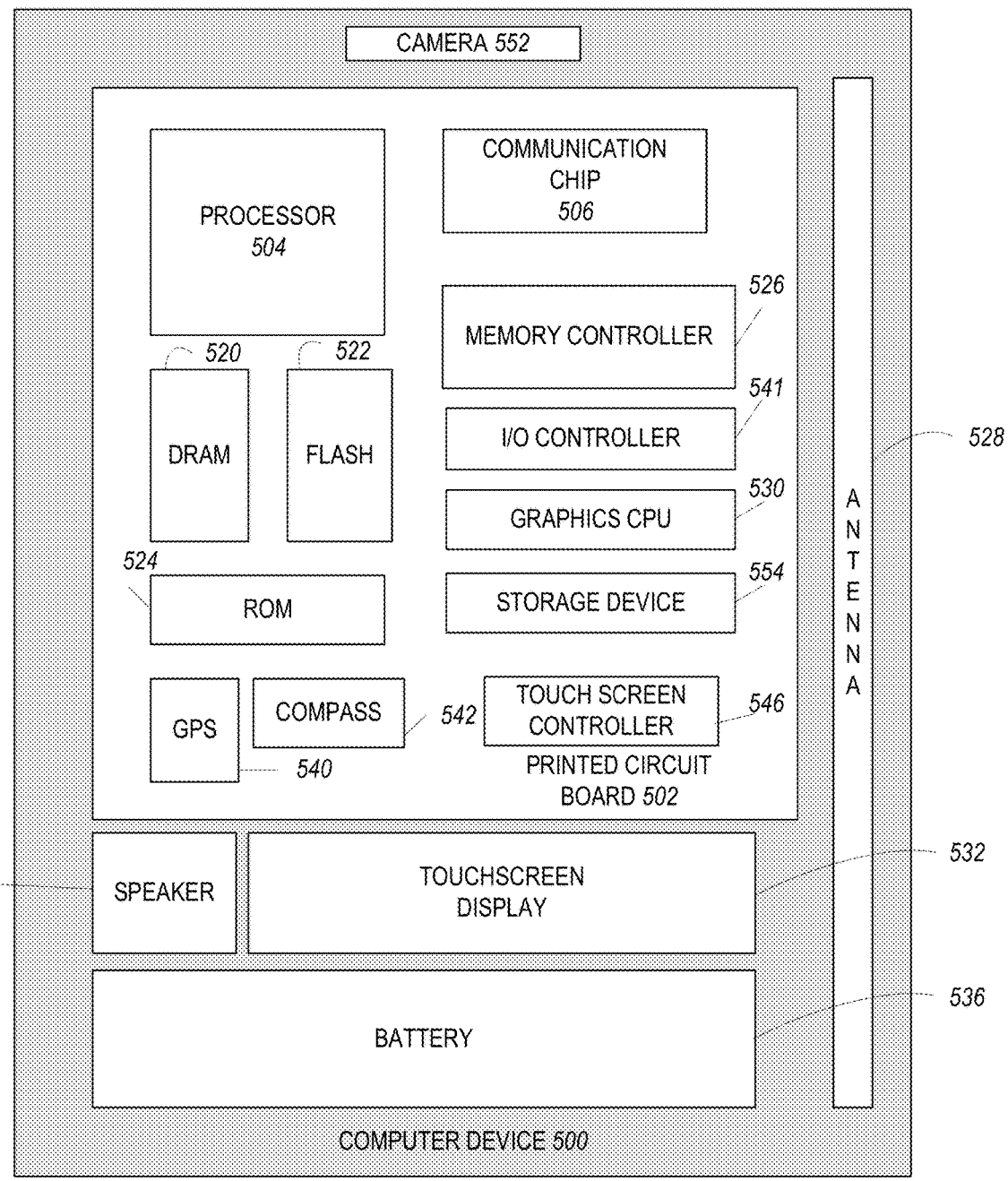
FIG. 4 is a block diagram of an example computer that can be used to implement some or all of the components of the system of FIG. 1, according to various embodiments.

FIG. 4 illustrates an example computer device 500 that may be employed by the apparatuses and/or methods described herein, in accordance with various embodiments. As shown, computer device 500 may include a number of components, such as one or more processor(s) 504 (one shown) and at least one communication chip 506. In various embodiments, the one or more processor(s) 504 each may include one or more processor cores. In various embodiments, the one or more processor(s) 504 may include hardware accelerators to complement the one or more processor cores. In various embodiments, the at least one communication chip 506 may be physically and electrically coupled to the one or more processor(s) 504. In further implementations, the communication chip 506 may be part of the one or more processor(s) 504. In various embodiments, computer device 500 may include a printed circuit board (PCB) 502. For these embodiments, the one or more processor(s) 504 and communication chip 506 may be disposed thereon. In alternate embodiments, the various components may be coupled without the employment of PCB 502.

Depending on its applications, computer device 500 may include other components that may be physically and electrically coupled to the PCB 502. These other components may include, but are not limited to, memory controller 526, volatile memory (e.g., dynamic random access memory (DRAM) 520), non-volatile memory such as read only memory (ROM) 524, flash memory 522, storage device 554 (e.g., a hard-disk drive (HDD)), an I/O controller 541, a digital signal processor (not shown), a crypto processor (not shown), a graphics processor 530, one or more antennae 528, a display, a touch screen display 532, a touch screen controller 546, a battery 536, an audio codec (not shown), a video codec (not shown), a global positioning system (GPS) device 540, a compass 542, an accelerometer (not shown), a gyroscope (not shown), a speaker 550, a camera 552, and a mass storage device (such as hard disk drive, a solid state drive, compact disk (CD), digital versatile disk (DVD)) (not shown), and so forth.

In some embodiments, the one or more processor(s) 504, flash memory 522, and/or storage device 554 may include associated firmware (not shown) storing programming instructions configured to enable computer device 500, in response to execution of the programming instructions by one or more processor(s) 504, to practice all or selected aspects of the system 100, method 200 and/or method 300 described herein. In various embodiments, these aspects may additionally or alternatively be implemented using hardware separate from the one or more processor(s) 504, flash memory 522, or storage device 554.

The communication chips 506 may enable wired and/or wireless communications for the transfer of data to and from the computer device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 506 may implement any of a number of wireless standards or protocols, including but not limited to IEEE 802.20, Long Term Evolution (LTE), LTE Advanced (LTE-A), General Packet Radio Service (GPRS), Evolution Data Optimized (Ev-DO), Evolved High Speed Packet Access (HSPA+), Evolved High Speed Downlink Packet Access (HSDPA+), Evolved High Speed Uplink Packet Access (HSUPA+), Global System for Mobile Communications (GSM), Enhanced Data rates for GSM Evolution (EDGE), Code Division Multiple Access (CDMA), Time Division Multiple Access (TDMA), Digital Enhanced Cordless Telecommunications (DECT), Worldwide Interoperability for Microwave Access (WiMAX), Bluetooth, derivatives thereof, as well as any other wireless protocols that are designated as 3G, 4G, 5G, and beyond. The computer device 500 may include a plurality of communication chips 506. For instance, a first communication chip 506 may be dedicated to shorter range wireless communications such as Wi-Fi and Bluetooth, and a second communication chip 506 may be dedicated to longer range wireless communications such as GPS, EDGE, GPRS, CDMA, WiMAX, LTE, Ev-DO, and others.

In various implementations, the computer device 500 may be a laptop, a netbook, a notebook, an ultrabook, a smartphone, a computer tablet, a personal digital assistant (PDA), a desktop computer, smart glasses, or a server. In further implementations, the computer device 500 may be any other electronic device that processes data.

Figure 5:
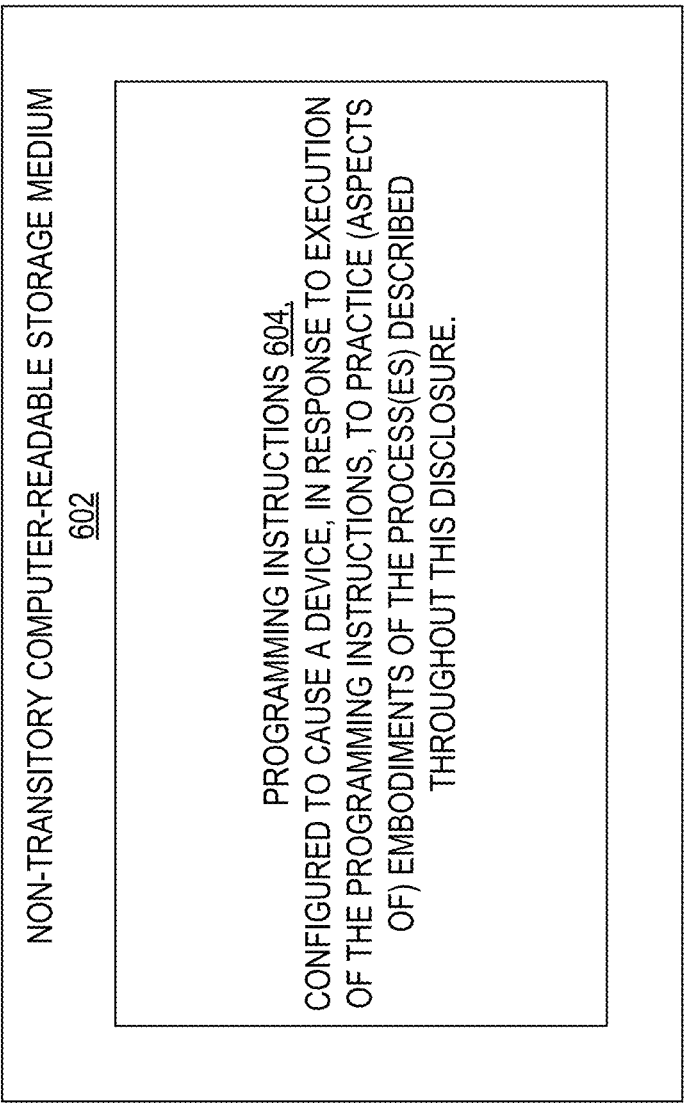
FIG. 5 is a block diagram of a computer-readable storage medium that can be used to implement some of the components of the system or methods disclosed herein, according to various embodiments.

As will be appreciated by one skilled in the art, the present disclosure may be embodied as methods or computer program products. Accordingly, the present disclosure, in addition to being embodied in hardware as earlier described, may take the form of an entirely software embodiment (including firmware, resident software, micro-code, etc.) or an embodiment combining software and hardware aspects that may all generally be referred to as a "circuit," "module" or "system." Furthermore, the present disclosure may take the form of a computer program product embodied in any tangible or non-transitory medium of expression having computer-usable program code embodied in the medium. FIG. 5 illustrates an example computer-readable non-transitory storage medium that may be suitable for use to store instructions that cause an apparatus, in response to execution of the instructions by the apparatus, to practice selected aspects of the present disclosure. As shown, non-transitory computer-readable storage medium 602 may include a number of programming instructions 604. Programming instructions 604 may be configured to enable a device, e.g., computer 500, in response to execution of the programming instructions, to implement (aspects of) system 100, method 200, and/or method 300. In alternate embodiments, programming instructions 604 may be disposed on multiple computer-readable non-transitory storage media 602 instead. In still other embodiments, programming instructions 604 may be disposed on computer-readable transitory storage media 602, such as, signals.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways.

This application is intended to cover any adaptations or variations of the embodiments discussed herein. Therefore, it is manifestly intended that embodiments be limited only by the claims and the equivalents thereof.

What is claimed is:

1. A method, comprising:
receiving, from a first device by a server at a first time, first location data and spatial position data associated with a device capturing a first image at a geographic location, the first location data comprised of a first geographic location data and a first 3D point cloud calculated for the first image, the first 3D point cloud including first depth data;
receiving, by the server at the first time, an augmented reality (AR) object placed within the first image by reference to the first 3D point cloud;
determining a first fingerprint of the location based in part on a plurality of objects detected within the first image and a plurality of anchor points identified in the plurality of detected objects within the first image;
storing, by the server, the AR object, the first location data, the first fingerprint of the location, and spatial position data associated with the first image;
receiving, from a second device by the server at a second time, second location data associated with a second image, the second location data comprised of a second geographic location data and a second 3D point cloud calculated for the second image, the second 3D point cloud including second depth data;
determining, when the second geographic location data indicates the second device is within a predetermined distance to the geographic location as indicated by the first geographic location data, a second fingerprint of the location based in part on a plurality of objects detected within the second image and a plurality of anchor points identified in the plurality of detected objects within the second image;
correlating the first location data with the second location data, wherein correlating the first location data with the second location data comprises comparing the first fingerprint with the second fingerprint, comparing the first fingerprint with the second fingerprint comprising determining when at least a predetermined number of the plurality of anchor points within the first image and the plurality of objects detected within the first image matches corresponding anchor points within the plurality of anchor points within the second image and corresponding objects within the plurality of objects detected within the second image; and
transmitting, by the server at a second time, the AR object when the first and second fingerprints are correlated.

2. The method of claim 1, wherein capturing the first location data associated with the first image further comprises determining an orientation of a camera capturing the first image.

3. The method of claim 1, wherein placing the AR object into the second image comprises placing the AR object into the second image with reference to the second 3D point cloud.

4. The method of claim 1, further comprising replacing the first fingerprint with the second fingerprint when the first fingerprint differs from the second fingerprint.

5. The method of claim 1, further comprising transmitting, by the server at a second time, one or more files tagged to the first image when the first and second fingerprints are correlated.

6. A non-transitory computer readable medium (CRM) containing instructions that, when executed by an apparatus, cause the apparatus to:
capture, at a first time, a first image at a geographic location and first location data associated with the first image, the first location data comprised of a first geographic location data and a first 3D point cloud calculated from the first image, the first point 3D cloud including first depth data;
place an augmented reality (AR) object in a first image location within the first image with reference to the first 3D point cloud;
determine a first fingerprint of the location based in part on a plurality of objects detected within the first image and a plurality of anchor points identified in the plurality of detected objects within the first image;
transmit, to a remote server, the AR object, the first image location, the first fingerprint, and first location data associated with the first image;
capture, at a second time, a second image at the geographic location and second location data associated with the second image, the second location data comprised of a second geographic location data and a second 3D point cloud calculated from the second image, the second 3D point cloud including second depth data;
determine, when the second geographic location data indicates the apparatus is within a predetermined distance to the geographic location as indicated by the first geographic location data, a second fingerprint of the location based in part on a plurality of objects detected within the second image and a plurality of anchor points identified in the plurality of detected objects within the second image;
transmit, to the remote server at a second time, the second location data and the second fingerprint;
receive, from the remote server, the AR object when the first location data correlates to the second location data, wherein the first location data correlates to the second location data when at least a predetermined number of the plurality of anchor points within the first image and the plurality of objects detected within the first image matches corresponding anchor points within the plurality of anchor points within the second image and corresponding objects within the plurality of objects detected within the second image; and
place the AR object into the second image at a second image location that corresponds to the first image location with reference to at least the corresponding anchor points within the plurality of anchor points within the second image.

7. The CRM of claim 6, wherein the first image and second image are videos.

8. The method of claim 1, further comprising receiving, by the server at a third time, an update to a position and configuration of the AR object, and storing, by the server, the updated position and configuration of the AR object.

9. A non-transitory computer readable medium (CRM) containing instructions that, when executed by an apparatus, cause the apparatus to:
capture an image at a geographic location and first location data associated with the image, the first location data comprised of a geographic location data and a first 3D point cloud calculated from the image, the first 3D point cloud including depth data;
determine a first fingerprint of the location based in part on a plurality of objects detected within the image and a plurality of anchor points identified in the plurality of detected objects within the image;
transmit, to a remote server, the first location data and first fingerprint;

receive, from the remote server, an augmented reality (AR) object and an AR object location when the geographic location data indicates the apparatus is within a predetermined distance to the geographic location as indicated by geographic location data stored on the remote server, and the first location data correlates to a second location data stored on the server captured prior to the capture of the image, the second location data including the AR object location, wherein the first location data correlates to the second location data when the first fingerprint matches a second fingerprint stored on the server, the second fingerprint based in part on a plurality of objects detected in a previously captured image of the location and a plurality of anchor points identified in the plurality of detected objects within the previously captured image, the first fingerprint matching to the second fingerprint when at least a predetermined number of the plurality of anchor points within the image and the plurality of objects detected within the image matches corresponding anchor points within the plurality of anchor points within the previously captured image and corresponding objects within the plurality of objects detected within the previously captured image; and place, with reference to at least the corresponding anchor points within the plurality of anchor points within the image, the AR object into the image at the AR object location within the first location data.

10. The CRM of claim 9, wherein the apparatus is a first mobile device, and the AR object and first image location are initially generated on a second mobile device.

11. The CRM of claim 9, wherein the instructions are to further cause the apparatus to modify a position and an orientation of the AR object, and to transmit, to the remote server, the modified position and orientation of the AR object.

* * * * *